(12) United States Patent
Fukasawa

(10) Patent No.: US 11,489,341 B2
(45) Date of Patent: Nov. 1, 2022

(54) POWER CONVERSION SYSTEM

(71) Applicant: TOSHIBA MITSUBISHI-ELECTRIC INDUSTRIAL SYSTEMS CORPORATION, Chuo-ku (JP)

(72) Inventor: Issei Fukasawa, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/416,875

(22) PCT Filed: Jul. 22, 2019

(86) PCT No.: PCT/JP2019/028683
§ 371 (c)(1),
(2) Date: Jun. 21, 2021

(87) PCT Pub. No.: WO2021/014540
PCT Pub. Date: Jan. 28, 2021

(65) Prior Publication Data
US 2022/0045519 A1    Feb. 10, 2022

(51) Int. Cl.
*H02J 3/02* (2006.01)
*H02J 3/38* (2006.01)
(Continued)

(52) U.S. Cl.
CPC ............ *H02J 3/381* (2013.01); *H02J 3/34* (2013.01); *H02M 1/36* (2013.01); *H02M 7/48* (2013.01); *H02J 2300/24* (2020.01)

(58) Field of Classification Search
CPC .......... H02J 3/381; H02J 3/34; H02J 2300/24; H02M 1/36; H02M 7/48
See application file for complete search history.

(56) References Cited

U.S. PATENT DOCUMENTS 5,212,630 A     5/1993 Yamamoto et al.
2017/0346294 A1*  11/2017 Lung ............... H02M 7/537

FOREIGN PATENT DOCUMENTS

JP    4-217822 A    8/1992
JP    9-28040 A     1/1997
(Continued)

OTHER PUBLICATIONS

International Search Report dated Aug. 20, 2019 in PCT/JP2019/028683 filed on Jul. 22, 2019, 2 pages.
(Continued)

*Primary Examiner* — Toan T Vu
(74) *Attorney, Agent, or Firm* — Oblon, McClelland, Maier & Neustadt, L.L.P.

(57) ABSTRACT

A power conversion system includes: a power converter connected between a DC power source and an AC power source; an AC switch connected between the power converter and the AC power source; an AC capacitor connected on the power converter side relative to the AC switch, on an output side of the power converter; and a control device configured to, in a state in which the AC switch is open, recognize a voltage of the AC capacitor and control the power converter to bring an output voltage of the power converter close to a voltage of the AC power source from the voltage of the AC capacitor gradually or in a step-by-step manner, and then close the AC switch. The power conversion system can suppress overcurrent at a time of start-up of a power converter and inrush current at a time of interconnection to an AC power source.

4 Claims, 3 Drawing Sheets

(51) Int. Cl.
*H02J 3/34* (2006.01)
*H02M 1/36* (2007.01)
*H02M 7/48* (2007.01)

(56) References Cited

FOREIGN PATENT DOCUMENTS

| | | |
|---|---|---|
| JP | 2014-117086 A | 6/2014 |
| JP | 2017-212838 A | 11/2017 |

OTHER PUBLICATIONS

Examination report dated Feb. 24, 2022 in corresponding Indian Patent Application No. 202117027726 (5 pages).

* cited by examiner

POWER CONVERSION SYSTEM

FIELD

The invention relates to a power conversion system.

BACKGROUND

PTL 1 discloses a power conversion system. The power conversion system can be interconnected to an AC power source while suppressing inrush current.

CITATION LIST

Patent Literature

[PTL 1] JP H9-28040 A

SUMMARY

Technical Problem

However, in the power conversion system described in PTL 1, if electric charge remains in an AC capacitor at the time of start-up of a power converter, there may be a large difference between an output voltage of the power converter at the time of start-up and a voltage of the AC capacitor. In this case, immediately after the start-up of the power converter, large current flows from the power converter to the AC capacitor, causing overcurrent.

The invention has been made to solve the aforementioned problem. An object of the invention is to provide a power conversion system capable of suppressing overcurrent at the time of start-up of a power converter and inrush current at the time of interconnection to an AC power source.

Solution to Problem

A power conversion system according to the invention includes: a power converter connected between a DC power source and an AC power source; an AC switch connected between the power converter and the AC power source; an AC capacitor connected on the power converter side relative to the AC switch, on an output side of the power converter; and a control device configured to, in a state in which the AC switch is open, recognize a voltage of the AC capacitor and control the power converter to bring an output voltage of the power converter close to a voltage of the AC power source from the voltage of the AC capacitor gradually or in a step-by-step manner, and then close the AC switch.

Advantageous Effects of Invention

According to the invention, in a state in which the AC switch is open, the control device recognizes a voltage of the AC capacitor and controls the power converter to bring an output voltage of the power converter close to the voltage of the AC power source from the voltage of the AC capacitor gradually or in a step-by-step manner, and then closes the AC switch. Therefore, it is possible to suppress overcurrent at the time of start-up of the power converter and inrush current at the time of interconnection to the AC power source.

DESCRIPTION OF EMBODIMENTS

Figure 1:
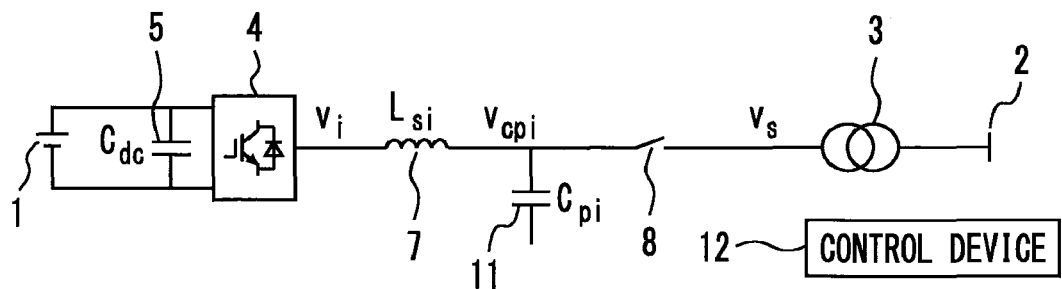
FIG. 1 is a configuration diagram of a system to which a power conversion system according to Embodiment 1 is applied.

An embodiment of the invention will be described with reference to the accompanying drawings. Note that in the drawings, parts that are identical or correspond to each other are provided with a same reference numeral. Overlapping descriptions of such parts will arbitrarily be simplified or omitted.

Embodiment 1

FIG. 1 is a configuration diagram of a system to which a power conversion system according to Embodiment 1 is applied.

In FIG. 1, a DC power source 1 is, e.g., a photovoltaic facility or a storage battery. The AC power source 2 is operated by, e.g., an electric power company. A converter 3 is connected between the DC power source 1 and the AC power source 2.

The power conversion system includes a power converter 4, a DC capacitor 5, an AC reactor 7, an AC switch 8, an AC capacitor 11 and a control device 12.

The power converter 4 is connected between the DC power source 1 and the converter 3. The DC capacitor 5 is connected between the DC power source 1 and the power converter 4.

The AC reactor 7 is connected between the power converter 4 and the converter 3. The AC switch 8 is connected between the AC reactor 7 and the converter 3. On the output side of the power converter 4, the AC capacitor 11 is connected on the AC reactor 7 side relative to the AC switch 8.

The control device 12 is provided so as to be capable of controlling the power converter 4 and the AC switch 8.

Next, control of a voltage instruction value by the control device 12 will be described with reference to FIG. 2.

Figure 2:
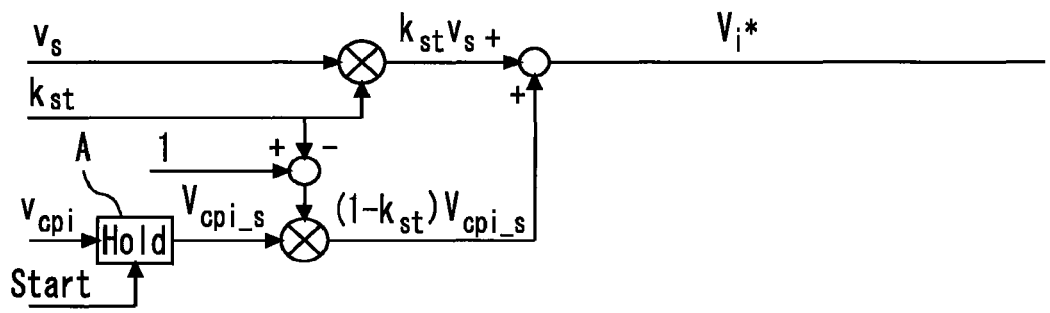
FIG. 2 is a diagram for describing control of a voltage instruction value by a control device in the power conversion system according to Embodiment 1.

FIG. 2 is a diagram for describing control of a voltage instruction value by a control device in the power conversion system according to Embodiment 1.

FIG. 2 illustrates a control block in a stationary coordinate system. In FIG. 2, $v_s$ is a vector quantity corresponding to a voltage of the AC power source 2 at a current point of time. $k_{st}$ is a coefficient and is a scalar quantity. $v_{cpi}$ is a vector quantity corresponding to a voltage applied to the AC capacitor 11. $v_{cpi\_s}$ is a vector quantity corresponding to a hold value of the voltage $v_{cpi}$ applied to the AC capacitor 11.

A hold block A outputs an input as it is when a Start signal is low, and when the Start signal is high, holds an input value of the Start signal at the time of rising and outputs the held value. Upon the coefficient $k_{st}$ being linearly changed from 0 to 1, $v_i^*$ follows the voltage $v_s$ of the AC power source 2 at the current point of time with the hold value $v_{cpi\_s}$ as a point of origin. The control device 12 provides a gate signal to a semiconductor device included in the power converter 4 so that an output voltage of the power converter 4 has the voltage instruction value $v_i^*$.

Note that although it has been described that in FIG. 2, the vector quantities are plotted in a stationary coordinate system, the vector quantities may be plotted in an arbitrary rotating coordinate system, for example, a dq coordinate system that rotates together with a voltage vector of the AC power source 2. In each of many power converters interconnected to AC power sources 2, a control arithmetic operation is performed for a voltage vector or a current vector plotted in a dq coordinate system that rotates together with a voltage vector of the AC power source 2. Therefore, as for the arithmetic operation in FIG. 2, also, the arithmetic operation can be more simplified using a dq coordinate system that rotates together with the voltage vector of the AC power source 2, rather than using a stationary coordinate system.

Next, the coefficient $k_{st}$ will be described with reference to FIG. 3.

Figure 3:
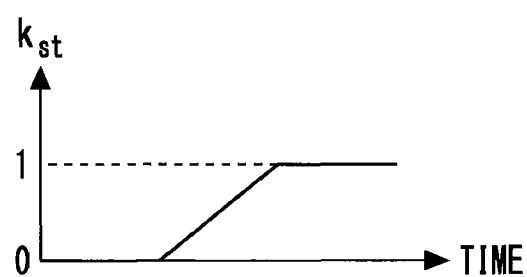
FIG. 3 is a diagram for describing an adjustment parameter used in the power conversion system according to Embodiment 1.
Figure 6:
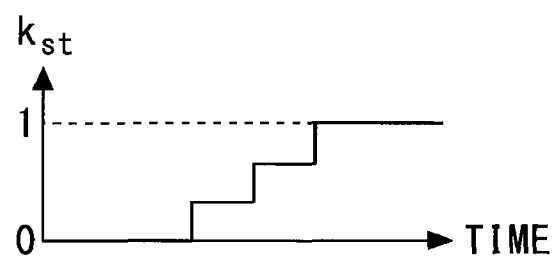
FIG. 6 is a diagram for describing a coefficient used in the power conversion system according to Embodiment 1.

Each of FIGS. 3 and 6 is a diagram for describing a coefficient used in the power conversion system according to Embodiment 1.

As illustrated in FIG. 3, a temporal change rate of the coefficient $k_{st}$ has a preset value. For example, the temporal change rate of the coefficient $k_{st}$ is set within a range in which current flowing to the power converter 4 is equal to or smaller than an instantaneous rated current of the power converter 4.

Although in FIG. 3, the coefficient $k_{st}$ is linearly changed from 0 to 1, the coefficient $k_{st}$ may be changed from 0 to 1 in a step-by-step manner as in FIG. 6. Provision of time during which the coefficient $k_{st}$ has a value between 0 and 1 enables suppression of inrush current rather than the power converter suddenly outputting a voltage that coincides with the voltage of the AC power source 2 at a start of operation or the coefficient $k_{st}$ being suddenly changed from 0 to 1.

Although in FIGS. 3 and 6, when the power converter 4 starts operation from a state in which the AC switch 8 is open, the power converter 4 outputs a voltage that coincides with the voltage of the AC capacitor 11, outputting a voltage between the voltage of the AC capacitor 11 and the voltage of the AC power source 2 also enables suppressing inrush current to some extent.

Although in FIGS. 3 and 6, the power converter 4 outputs a voltage that coincides with the voltage of the AC power source 2 in a state immediately before the AC switch 8 is closed, outputting a voltage between the voltage of the AC capacitor 11 and the voltage of the AC power source 2 immediately before AC switch 8 is closed also enables suppressing inrush current to some extent.

Next, an overview of operation of the control device 12 will be described with reference to FIG. 4.

Figure 4:
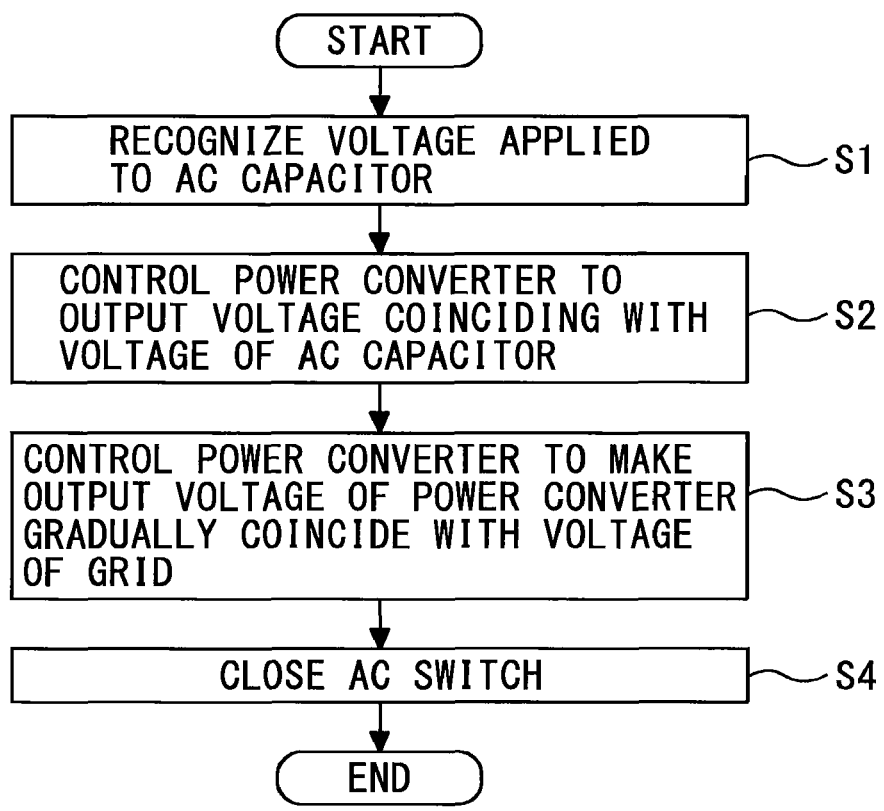
FIG. 4 is a flowchart for describing an overview of operation of the control device in the power conversion system according to Embodiment 1.

FIG. 4 is a flowchart for describing an overview of operation of the control device in the power conversion system according to Embodiment 1.

In step S1, the control device 12 recognizes a voltage applied to the AC capacitor 11 at a start of operation, in a state in which operation of the power converter is stopped. Subsequently, the control device 12 performs operation in step S2. In step S2, the control device 12 controls the power converter 4 to output a voltage that coincides with the voltage of the AC capacitor 11. Subsequently, the control device 12 performs operation in step S3. In step S3, the control device 12 controls the power converter 4 to make the output voltage of the power converter 4 gradually coincide with a voltage of the AC power source 2. Subsequently, the control device 12 performs operation in step S4. In step S4, if the output voltage of the power converter 4 coincides with the voltage of the AC power source 2, the control device 12 closes the AC switch 8.

According to Embodiment 1 described above, in a state in which the AC switch 8 is open, the control device 12 starts operation of the power converter 4 in such a manner that an output voltage of the power converter 4 coincides with a voltage applied to the AC capacitor 11. Therefore, the output voltage of the power converter at the start of operation coincides with the voltage of the AC capacitor, and thus, no inrush current flows when the operation is started. As a result, it is possible to suppress overcurrent, or overvoltage caused by resonance.

Subsequently, the control device 12 controls the power converter 4 to make the output voltage of the power converter 4 gradually coincide with the voltage of the AC power source 2. Subsequently, the control device 12 closes the AC switch 8. Therefore, it is possible to suppress overcurrent at the time of start-up of the power converter 4 and inrush current at the time of interconnection to the AC power source 2.

In the control device 12, the temporal change rate of the output voltage of the power converter 4 is set in such a manner that when the power converter 4 is controlled so that the output voltage of the power converter 4 gradually synchronizes with the voltage of the AC power source 2, current flowing to the power converter 4 becomes equal to or below the instantaneous rated current of the power converter 4. Therefore, at the time of start-up of the power converter 4, the power converter 4 can be interconnected to the AC power source 2 in a short time within a range of a rating of the power converter 4.

Next, an example of the control device 12 will be described with reference to FIG. 5.

Figure 5:
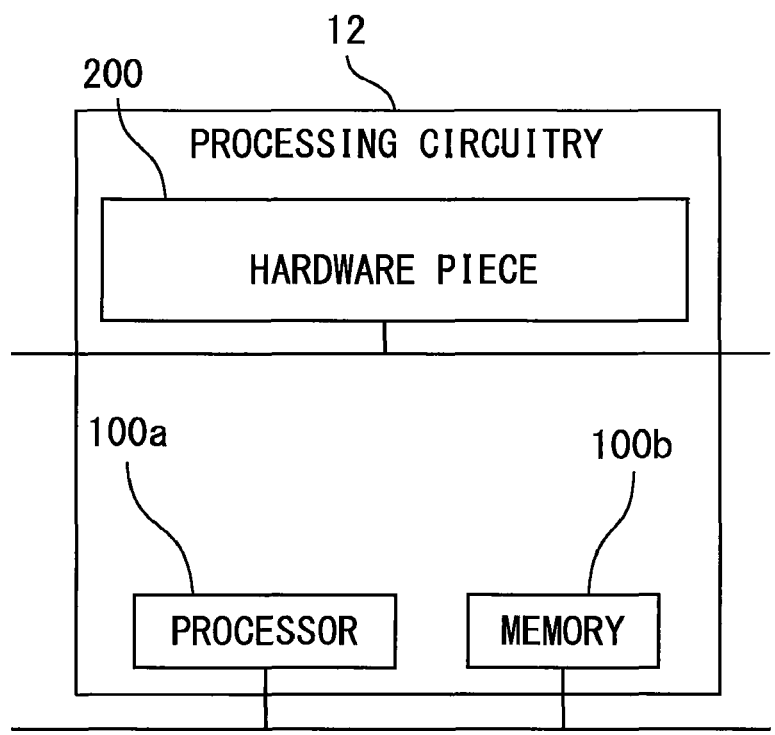
FIG. 5 is a hardware configuration diagram of the control device in the power conversion system according to Embodiment 1.

FIG. 5 is a hardware configuration diagram of the control device in the power conversion system according to Embodiment 1.

Each of functions of the control device 12 can be implemented by processing circuitry. For example, the processing circuitry includes at least one processor 100a and at least one memory 100b. For example, the processing circuitry includes at least one dedicated hardware piece 200.

Where the processing circuitry includes at least one processor 100a and at least one memory 100b, each of the functions of the control device 12 is implemented by software, firmware or a combination of software and firmware. At least one of the software and the firmware is described in the form of programs. At least one of the software and the firmware is stored in the at least one memory 100b. The at least one processor 100a implements respective functions of the control device 12 by reading and executing the programs stored in the at least one memory 100b. The at least one processor 100a is also referred to as a central processing unit, a processing device, an arithmetic device, a microprocessor, a microcomputer or a DSP. For example, the at least one memory 100b is a non-volatile or volatile semiconductor memory such as a RAM, a ROM, a flash memory, an EPROM or an EEPROM, a magnetic disk, a flexible disk, an optical disk, a compact disc, a mini-disk or a DVD.

Where the processing circuitry includes the at least one dedicated hardware piece 200, the processing circuitry is implemented by, for example, a single circuit, a complex circuit, a programmed processor, a parallel-programmed processor, an ASIC, an FPGA or any of combinations thereof. For example, the functions of the control device 12 are implemented by respective processing circuits. For example, the functions of the control device 12 are collectively implemented by the processing circuitry.

Some of the functions of the control device 12 may be implemented by the dedicated hardware piece 200 and others of the functions may be implemented by the software or the firmware. For example, a function that controls the power converter 4 may be implemented by the processing circuitry serving as the dedicated hardware piece 200 and the functions other than the function that controls the power converter 4 may be implemented by the at least one processor 100a reading and executing programs stored in the at least one memory 100b.

As described above, the processing circuitry implements each of the functions of the control device 12 by means of the hardware piece 200, the software, the firmware or any of combinations thereof.

INDUSTRIAL APPLICABILITY

As above, a power conversion system according to the invention can be used for a system that suppresses overcurrent and inrush current.

REFERENCE SIGNS LIST

1 DC power source
2 AC power source
3 converter
4 power converter
5 DC capacitor
7 AC reactor
8 AC switch
11 AC capacitor
12 control device
100a processor
100b memory
200 hardware piece

The invention claimed is:
1. A power conversion system comprising:
a power converter connected between a DC power source and an AC power source;
an AC switch connected between the power converter and the AC power source;
an AC capacitor connected on the power converter side relative to the AC switch, on an output side of the power converter; and
a control device configured to, in a state in which the AC switch is open,
1) recognize a voltage caused by charge remaining in the AC capacitor, and
(2) control the power converter to output a voltage that coincides with the recognized voltage charge remaining in the AC capacitor to bring an output voltage of the power converter close to a voltage caused by charge remaining in the AC power source from the voltage caused by charge remaining in the AC capacitor gradually or in a step-by-step manner, and then close the AC switch.

2. The power conversion system according to claim 1, wherein a temporal change rate of the output voltage of the power converter is set such that when the control device controls the power converter to bring the output voltage of the power converter close to the voltage of the AC power source from the voltage caused by charge remaining in the AC capacitor gradually, current flowing to the AC power source is equal to or below an instantaneous rated current of the power converter.

3. The power conversion system according to claim 1, wherein a range of change of the output voltage of the power converter is set such that when the control device controls the power converter to bring the output voltage of the power converter close to the voltage of the AC power source from the voltage caused by charge remaining in the AC capacitor in a step-by-step manner, current flowing to the AC power source is equal to or below an instantaneous rated current of the power converter.

4. The power conversion system according to claim 1, wherein the control device performs an arithmetic operation to calculate the voltage caused by charge remaining in the AC capacitor and the voltage of the AC power source in a coordinate system fixed to a phase of the voltage of the AC power source, and controls the power converter to bring the output voltage of the power converter in the coordinate system close to the voltage of the AC power source in the coordinate system from the voltage caused by charge remaining in the AC capacitor in the coordinate system gradually or in a step-by-step manner.

* * * * *